Oct. 12, 1926.  
A. S. McCASKEY  
1,602,691
FLEXIBLE SHAFT
Filed May 8, 1924
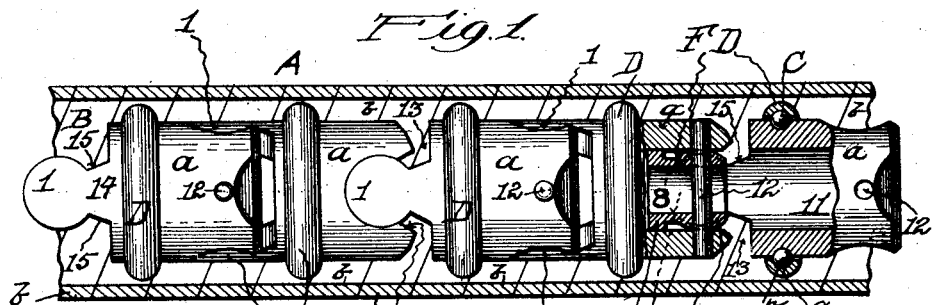
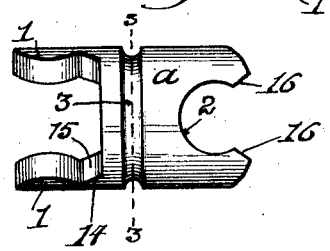
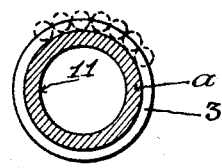
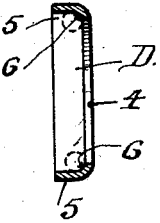
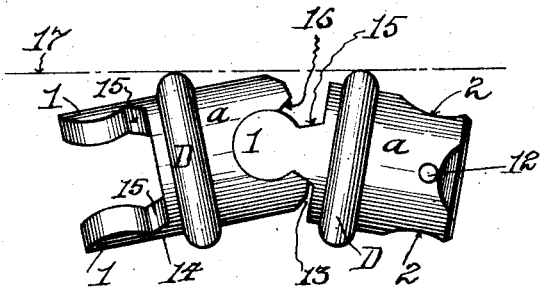
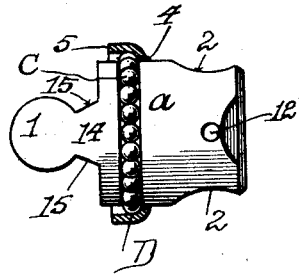
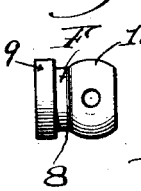
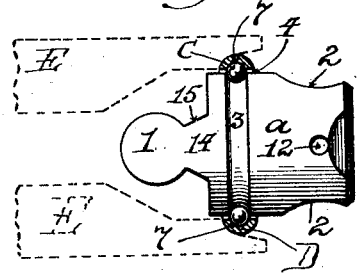
INVENTOR:
Alfred S. McCaskey
By Taylor Brown
his Attorney Patented Oct. 12, 1926.

1,602,691

UNITED STATES PATENT OFFICE.

ALFRED S. McCASKEY, OF CHICAGO, ILLINOIS.

FLEXIBLE SHAFT.

Application filed May 8, 1924. Serial No. 711,774.

This invention relates to flexible shafts, and more particularly to flexible shafts formed of a plurality of short links with an anti-friction ball bearing unit on each link.

The object of my invention is to provide a flexible shaft with anti-friction means which will prevent the links of the shaft from contacting with the shaft casing or sheath. This I accomplish by equipping each link of the flexible shaft with circumferential anti-friction units, and by providing a jointed connection between the adjacent link members of such character as to limit the extent of pivotal movement of the links; the length of the links, the diameter of the anti-friction units thereon, and the construction governing the extent of pivotal movement of the links being so correlated as to prevent contacting of the links of the shaft with the casing or sheath in every position of the shaft.

Another object of the invention is to reduce friction, heating and wear of the flexible shaft and its casing or sheath to the lowest possible factor, and to promote free and easy movement of the shaft as a whole.

The objects and advantages of my invention will be manifest as I proceed with my specification.

In that form of the invention which I have chosen to illustrate in the accompanying drawings:—

Fig. 1 is a side view of a portion of a flexible shaft, partly in section, enclosed within a surrounding sheath or casing shown in section, each link being provided with an anti-friction unit.

Fig. 2 is a side view of a single link, detached, and without the anti-friction unit.

Fig. 3 is a transverse, sectional view of a detached link taken in the vertical plane indicated by the dotted line 3—3 of Fig. 2, showing in dotted lines the position of some of the anti-friction elements.

Fig. 4 is a side view, partly in section, of the enclosing ring element of the anti-friction unit.

Fig. 5 is a side view of a retaining member, detached.

Fig. 6 is a side view of a detached link with anti-friction balls in the link raceway and the ring element in position to enclose the balls.

Fig. 7 is a view similar to Fig. 6 showing, however, the ring element in its final position to completely enclose the balls.

Fig. 8 is a side elevation of two adjacent link units of the shaft flexed to the limit of their pivotal movement.

Almost any form of flexible shaft, the units of which are so designed as to permit of a circumferential raceway groove being used, will answer for the purposes of my invention, but the type illustrated is recommended as especially desirable, the same being the flexible shaft set forth and claimed in U. S. Letters Patent No. 1,258,233, issued to me on the 5th day of March, 1918.

In said drawings, A represents a portion of a flexible shaft, as a whole, made up of a plurality of tubular, hollow links or units $a$. Each link has a pair of spaced apart, diametrically oposite, disc shaped tongues 1 on one end and a pair of circular tongue-grooves or recesses 2 on the other end. The side walls of the tongues 1 of one link unit register with the side walls of the recesses of the next adjacent link unit, whereby a pivotal jointed connection is formed, as will be readily understood.

B is an enclosing sheath or casing for the flexible shaft A, of any desirable material, but shown herein as formed of a closely wound spiral of square section wire $b$, and this in turn may be enclosed within an outer protective covering of leather or other suitable material, not shown.

The anti-friction element may consist of members C, which in this instance are small steel balls enclosed in a movable ball-retaining ring member D.

The link $a$ is cylindrical in its general contour, and is provided with a circumferential, annular groove 3, of a size to accommodate the balls C. This groove 3 constitutes one part of a ball race-way and is of a depth equal to or slightly less than one-half the diameter of the balls, as clearly shown in Fig. 3. The ring D is apertured at 4, and is made in the first instance, cup-shaped, as shown in Figs. 4 and 6; that is, it has a circumferential flange member 5 which is joined to the ring D with a rounded corner 6, the inside being formed on a radius equal in length to one-half the diameter of the ball C. The flange 5 of the ring D is then shaped to fit the ball C, as shown in Fig. 7, its interior surface, including the curved part 6, thus constituting an annular groove 7, which forms the other part of the raceway for the balls C.

The ring D may be formed and the balls C may be assembled upon a link member $a$ in any suitable manner, but I have illustrated one simple method of putting the several parts together. The ring D is first slipped over the link member $a$, and the balls C laid in the groove raceway 3, in contact with the rounded part 6 of the ring. Then the flange 5 of the ring is pressed or rolled into its final shape to complete the raceway 7 by any suitable die or tool indicated by the dotted lines E in Fig. 7. The link is now equipped with an anti-friction element or unit comprising the balls C held in place by a rotatable ring member D, and the link members are engaged or pivotally united, end to end, to form the shaft A, by the inter-engagement of the lugs 1, 1, of one link with recesses 2, 2, of the adjacent link.

Within each link is a retaining member F (see Figs. 1 and 5) consisting of a hollow or tubular body 8 provided with two circumferential, curved, spaced apart bearing portions 9 and 10, the latter being preferably convexly curved as shown.

These bearing surfaces 9 and 10 are of a diameter to fit within and bear against the inner surface 11 of the link $a$. The link and the retaining member F are united by means of a pin 12 which is passed through the member F and the link $a$, as clearly shown in Fig. 1.

When the links are assembled to form the shaft, there is a space, indicated at 13, between the several links $a$. The tongue 1 is united to the body of the link by a connecting neck portion 14, each side wall 15 of which is straight and angularly disposed. These walls form stops or shoulders for correspondingly shaped walls 16, 16, on the recess end of the adjacent link.

By reference to Fig. 8, it will be understood that one wall 16 contacts with one wall 15 when the shaft is flexed to the limit of the pivotal movement between any two links.

It will also be understood that it is desirable to have the sheath member of such size as to leave as small a space as possible between its interior and the exterior of the shaft while at the same time permitting of the desirable amount of distortion of flexure from a straight line in the shaft when in operation.

In order to avoid the many troubles arising from friction, overheating, wear, and so forth, due to the rapid impinging of the link members when the shaft is being rotated, I provide an anti-friction ball bearing unit on each link. By reference to Fig. 1 it will be understood that the diameter of the ring member of this unit is such as to almost but not quite contact, normally, with the casing, and that when the shaft is flexed as indicated in Fig. 8, it does contact with said casing; the dotted line 17 indicating the casing wall. Although the anti-friction members are in contact with the casing wall when the shaft is flexed, no part of the links of the shaft can contact with the casing even though the links $a$, $a$, are at the extreme limit of their pivotal movement.

Manifestly, if it is desired to give the shaft greater flexibility by constructing the parts 15 and 16 to allow of greater pivotal movement between the links $a$, $a$, this may be done without departing from my invention, by simply increasing the diameter of the circumferential anti-friction member on each link. The advantages of my invention will be attained by the proper correlation between the diameter of the antifriction units and the link construction which determines the extent of the pivotal movement thereof.

I have found in the practical use of shafts embodying my invention, that friction is reduced to a negligible quantity, the shaft and casing do not become heated, that the power required to drive the shaft for a given work is greatly reduced and that the shaft has a much longer life and increased utility than have shafts not so constructed.

I claim as my invention:—

1. A flexible shaft comprising a plurality of pivotally joined, short, tubular links, a movable anti-friction member circumferentially mounted upon each link, a sheath surrounding the shaft, said anti-friction member being normally out of contact with the latter, and complemental, angularly disposed shoulders on the ends of adjacent links, said shoulders, the diameter of the anti-friction members and the length of the links being correlated to prevent the contact of said links with the sheath when pivotal movement occurs between adjacent links.

2. A plurality of short, tubular link units jointedly united to form a flexible shaft, an enclosing sheath, a circumferential groove on each link midway of its ends, a ring on each link the interior of which together with said grooves form an enclosed raceway, anti-friction balls in said raceway, the interior diameter of the sheath being only slightly in excess of the exterior diameter of the rings, and means on connected links to prevent contact with the sheath during any pivotal movement between adjacent links.

3. An interchangeable link unit for flexible shafts comprising a short, tubular body member, a pair of separated pivot disc-shaped lugs extending longitudinally from one end, each united to the body by a web or neck having angular stop surfaces on each side of its median axis, said body being provided on its other end with circular recesses adapted to receive similar disc lugs of another link unit and complemental, angular, shouldered surfaces adjacent the said recesses adapted to contact with the angular stop surfaces of an adjacent link to limit the extent of pivotal movement between two interengaged links, each link being provided with a circumferential antifriction member.

In testimony, that I, claim the foregoing as my invention I affix my signature this 30th day of April, 1924.

ALFRED S. McCASKEY.